United States Patent [19]
Shoji et al.

[11] Patent Number: 5,165,284
[45] Date of Patent: Nov. 24, 1992

[54] PRESSURE SENSOR UTILIZING A MAGNETOSTRICTION EFFECT

[75] Inventors: Rihito Shoji, Yawata; Hiroyuki Hase, Kyoto; Masayuki Wakamiya, Suita, all of Japan

[73] Assignee: Matsushita Electric Industrial Co., Ltd., Osaka, Japan

[21] Appl. No.: 678,160

[22] Filed: Apr. 1, 1991

[30] Foreign Application Priority Data

Apr. 5, 1990 [JP] Japan ................................. 2-90804
Aug. 28, 1990 [JP] Japan ................................. 2-227054
Jan. 10, 1991 [JP] Japan ................................. 3-001726

[51] Int. Cl.$^5$ ................................................ G01L 9/16
[52] U.S. Cl. ................................. 73/728; 73/DIG. 2; 336/30
[58] Field of Search ................. 73/728, 722, DIG. 2, 73/862.69, 779; 336/30, 20

[56] References Cited

U.S. PATENT DOCUMENTS 3,197,722 7/1965 Chass ........................................ 336/30
4,938,069 7/1990 Shoji et al. ............................... 73/728

FOREIGN PATENT DOCUMENTS 0167692 1/1986 European Pat. Off. .
3604088 8/1987 Fed. Rep. of Germany .

Primary Examiner—Donald O. Woodiel
Attorney, Agent, or Firm—Stevens, Davis, Miller & Mosher

[57] ABSTRACT

A pressure sensor has a recess formed in outer surfaces of a deforming part and a non-deforming part such that a pair of steps are formed at opposite ends of the recess. The deforming part is strained by a pressure whereas the non-deforming part is not strained by the pressure. An amorphous magnetic alloy film is received in and affixed relative to the recess, and extends between the pair of steps. The depth of the recess is larger than the thickness of the film. A pair of permeability detector elements are mounted respectively on the deforming part and the non-deforming part so as to detect a change in permeability of the film.

7 Claims, 10 Drawing Sheets

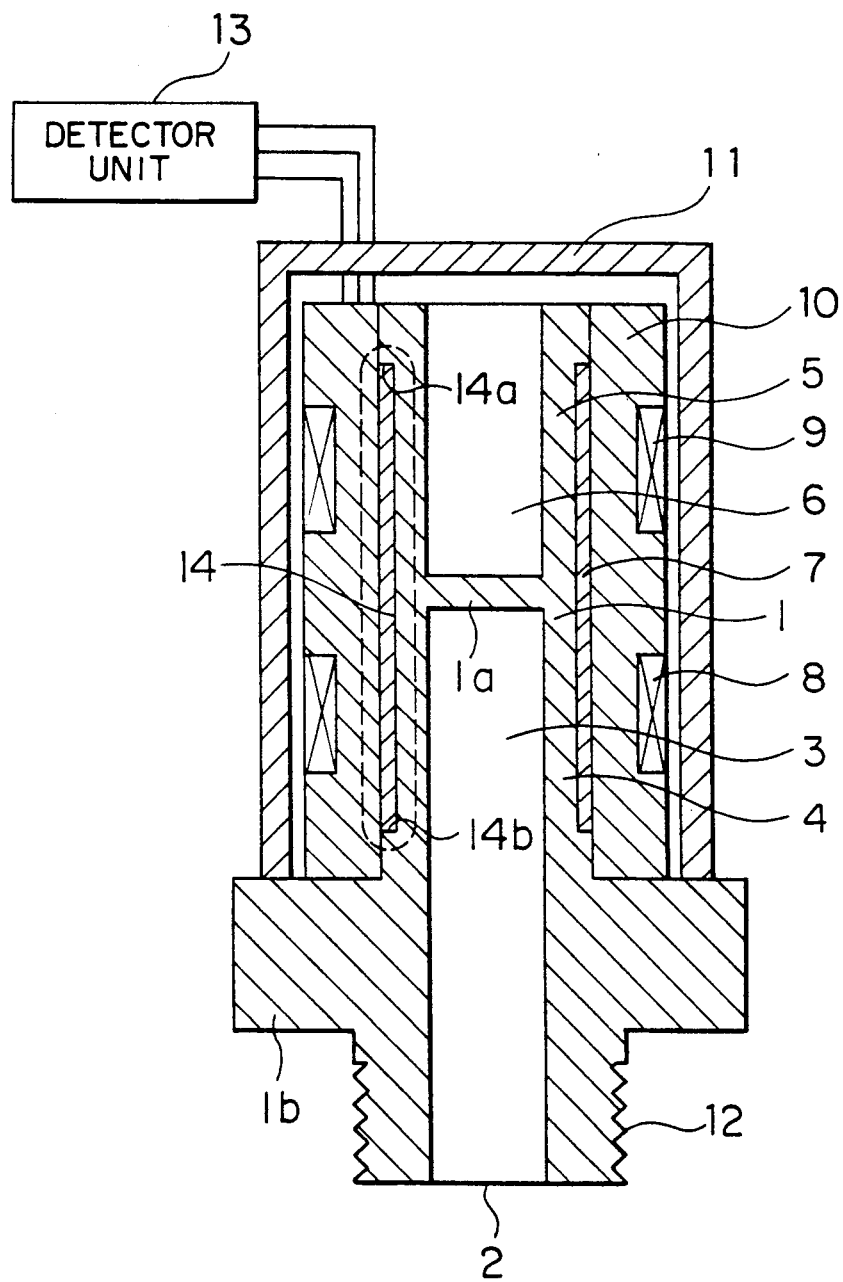

1

PRESSURE SENSOR UTILIZING A MAGNETOSTRICTION EFFECT

BACKGROUND OF THE INVENTION

1. Field of the Invention

This invention relates to a pressure sensor utilizing the magnetostriction effect of an amorphous magnetic alloy.

2. Description of the Prior Art

The inventors have earlier proposed a pressure sensor utilizing the magnetostriction effect of an amorphous magnetic alloy (U.S. Pat. No. 4,938,069).

FIG. 7 is a schematic vertical cross-sectional view of one example of such pressure sensor. This pressure sensor comprises a cylindrical base or body 1 made of titanium, a film 7 of an amorphous magnetic alloy mounted around the outer periphery of the body 1, a cylindrical tubular bobbin 10 disposed radially outwardly of the film 7 and mounted around the outer periphery of the body 1, a pressure detector coil 8 wound on the outer periphery of the bobbin 10, a dummy coil 9 wound on the outer periphery of the bobbin 10, a cup-shaped yoke 11 mounted radially outwardly of the two coils 8 and 9, and a detector unit 13 electrically connected to the two coils 8 and 9. The body 1 has two central holes separated from each other by a partition wall 1a, the two central holes defining a pressure chamber 3 and a dummy chamber (or reference chamber) 6, respectively. The body 1 also has a pressure introducing opening 2 defined by an open end of the pressure chamber 3, a greater-diameter flange 1b formed on the outer periphery of the body 1 and disposed adjacent to the end of the body 1 having pressure introducing opening 2, a recess (smallest-diameter portion) 14 formed in the outer periphery of the body 1 and extending throughout the entire length of the smaller-diameter portion of the body 1 between the end portion (the upper end portion in FIG. 7) of the body 1 remote from the pressure introducing opening 2 and the greater-diameter flange 1b, and a fixing screw thread 12 formed on the outer periphery of the end portion (the lower end portion in FIG. 7) of the body 1 close to the pressure introducing opening 2. A wall part which defines part of the pressure chamber 3 and exists between the pressure chamber 3 and the recess 14 is a deforming part 4 which is deformed in response to a change in the pressure within the pressure chamber 3. Another wall part, being integrated with the above-mentioned wall, which defines part of the dummy chamber 6 and exists between the dummy chamber 6 and the recess 14 is a non-deforming part 5 which is not influenced by the pressure in the chamber 3. The film 7 which is a rectangular thin sheet of an amorphous magnetic alloy is disposed in the recess 14, and is wound around the outer periphery of the body 1, and is fixedly bonded thereto by an adhesive under pressure. The depth of the recess 14, that is, the height of steps 14a and 14b, is determined to be equal to the sum of the thickness of the wound film 7 and the thickness of the adhesive layer. The fixed bonding of the film 7 by application of pressure is carried out by fitting a tube 21 of a heat-shrinkable resin on the film 7 and then by heating this tube (see FIGS. 8a to 8c). After this bonding operation, the tube is removed. The steps 14a and 14b serve as positioning means which prevents the film 7 from being displaced along the axis of the body 1 during the fixed bonding of the film 7 by the adhesive. The bobbin 10 having two peripheral grooves in its outer peripheral surface covers the recess 14, and is fitted on the body 1. The pressure detector coil 8 is received in one of the two peripheral grooves close to the flange 1b, and the dummy coil 9 is received in the other peripheral groove. The two coils 8 and 9 are used as permeability detector elements, and cooperate with the amorphous magnetic alloy film 7 to form a magnetic circuit.

The pressure of a fluid to be measured is fed to the pressure chamber 3 via the pressure introducing opening 2, and applies a force in a direction to expand the deforming part 4 defining the pressure chamber 3. As a result, the part 4 is deformed, so that the permeability of the amorphous magnetic alloy film 7 adhesively bonded to the outer surface of the deforming part 4 is changed. This change of permeability is detected by the pressure detector coil 8 as a change in inductance, and the pressure change is obtained by a differential output between the coil 8 and the dummy coil 9.

In manufacturing this pressure sensor, the yield rate (the ratio of products coming up to the standard, of which zero-point drift and sensitivity change due to change of temperature are less than ±0.1% Full Scale/°C. respectively) of the pressure sensor has been as low as about 30%. This is due to the uneven thickness of the adhesive layer between the amorphous magnetic alloy film 7 and the body 1 and also to the bonding step. Namely, in the above construction, when the layer of the adhesive applied between the body 1 and the amorphous magnetic alloy film 7 is uneven from one place to another, the excess adhesive can not escape, and the resulting layer of the cured adhesive is irregular in thickness. For bonding the amorphous magnetic alloy film 7 to the body 1, the tube 21 of a heat-shrinkable resin is used. However, the degree of heat-shrinkage of this type is inevitably irregular. This condition is shown in FIGS. 8a to 8c which are enlarged views of that portion of FIG. 7 indicated by a dotted-line. The heat-shrinkable tube 21 is not always shrunk uniformly, and is distorted right or left, or bulges at its central portion. Therefore, the thickness of the adhesive layer 22 inside the tube 21 becomes irregular, which lowers the yield rate in manufacturing the pressure sensor.

When the pressure sensor of the above construction was dipped in hot water at 80° C., rust was generated on the surface of the amorphous magnetic alloy film 7 in about one day, thus exhibiting a poor corrosion resistance. Further, since the amorphous magnetic alloy film 7 has a shape as shown in FIGS. 9 and 10, a gap 23 (where the amorphous magnetic alloy film 7 is absent, and hence only the adhesive layer is present) is formed after this film 7 is adhesively bonded to the body 1. This pressure sensor was subjected to a heat cycle test (cycle of −40° C. and 150° C.), and as a result, tongue-shaped exfoliation parts 24 of the adhesive layer developed respectively at the opposite ends of the gap 23 after the heat cycle test was conducted 500 times. Thus, the durability of the pressure sensor was lowered.

As described above, the pressure sensor of the above construction has problems such as a low yield rate and poor corrosion resistance and durability.

SUMMARY OF THE INVENTION

It is therefore an object of this invention to provide a pressure sensor which is excellent in corrosion resistance and durability, and of which the yield rate in manufacturing is improved.

According to the present invention, there is provided a pressure sensor comprising a pressure introducing portion; a cylindrical deforming part defining a pressure chamber capable of being strained by a pressure fed thereto via the pressure introducing portion; a cylindrical non-deforming part; a film of an amorphous magnetic alloy exhibiting a magnetostriction effect secured to the deforming part and the non-deforming part; and a pair of permeability detector elements mounted respectively on the deforming part and the non-deforming part so as to detect permeability of the amorphous magnetic alloy film, the permeability detector elements cooperating with the amorphous magnetic alloy film to form a magnetic circuit; the pressure being determined by the difference between the permeabilities detected respectively by the pair of permeability detector elements, which difference occurs when the pressure is fed to the pressure chamber; a recess being formed in outer surfaces of the deforming part and the non-deforming part, so that a pair of steps are formed at opposite ends of the recess, respectively; wherein the depth of the recess is larger than the thickness of the amorphous magnetic alloy film; and the amorphous magnetic alloy film is received in and affixed relative to the recess, and extends between the pair of steps.

Preferably, a buffer material, which is an easily deformable pressure medium including a bonding material (for example, an imide-system adhesive), is applied to an outer surface of the amorphous magnetic alloy film.

According to the above mentioned construction, when the amorphous magnetic alloy film is to be bonded to the deforming part and the non-deforming part, the non-uniformity of the amount of the adhesive is absorbed by the steps, and also the non-uniformity of the heat-shrinkable tube is absorbed by the buffer material. Therefore, the yield rate is improved. Further, since the buffer material covers the amorphous magnetic alloy film, the corrosion resistance and the durability are improved.

BRIEF DESCRIPTION OF THE DRAWINGS

FIG. 7 is a vertical cross-sectional view of a conventional pressure sensor;

DESCRIPTION OF THE PREFERRED EMBODIMENTS

The invention will now be described with reference to the drawings.

EXAMPLE 1

Figure 1:
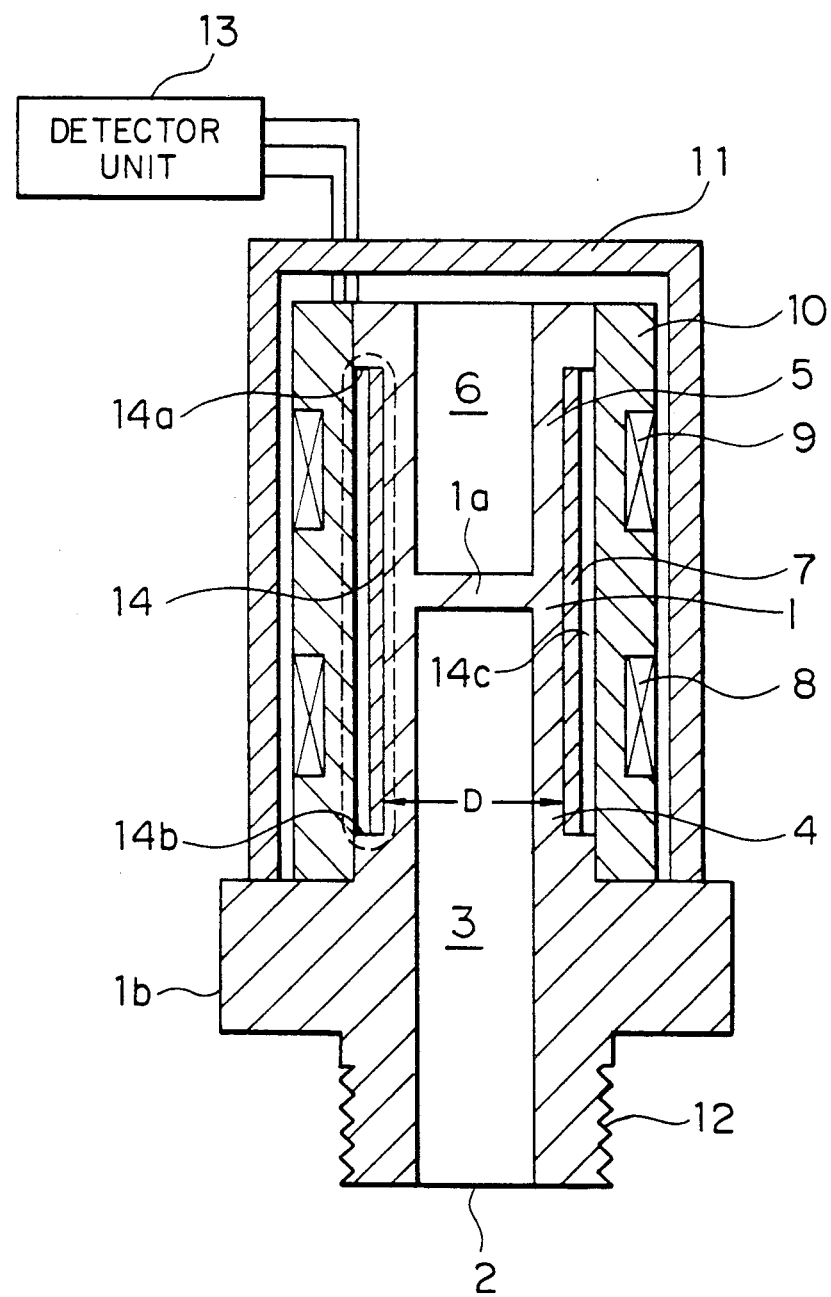
FIG. 1 is a vertical cross-sectional view of a first embodiment of a pressure sensor of the present invention.

FIG. 1 shows a pressure sensor of the present invention. The pressure sensor comprises a cylindrical main body 1 made of titanium and having an outer diameter (D) of 10 mm (at a recess 14) and an entire length of 70 mm, a film 7 of an amorphous magnetic alloy mounted around the outer periphery of the body 1, a cylindrical bobbin 10 of a phenolic resin disposed radially outwardly of the film 7 and mounted around the outer periphery of the body 1, a pressure detector coil 8 wound on the outer periphery of the bobbin 10, a dummy coil 9 wound on the outer periphery of the bobbin 10, a yoke 11 of 45%Ni-Fe alloy disposed radially outwardly of the coils 8 and 9, and a detector unit 13 electrically connected to the two coils 8 and 9.

The body 1 has two central holes separated from each other by a partition wall 1a, the two central holes defining a pressure chamber 3 and an dummy (or reference) chamber 6, respectively. The body 1 also has a pressure introducing opening 2 defined by an open end of the pressure chamber 3, a greater-diameter flange 1b formed on the outer periphery of the body 1 and disposed adjacent to the end of the body 1 having the pressure introducing opening 2, the above mentioned recess (smallest-diameter portion) 14 formed in the outer periphery of the body 1 and extending throughout the entire length of the smaller-diameter portion of the body 1 between the end portion of the body 1 remote from the pressure introducing opening 2 and the greater-diameter flange 1b, and a fixing screw thread 12 formed on the outer periphery of the end portion of the body 1 close the pressure introducing opening 2. A wall part which defines part of the pressure chamber 3 and exists between the pressure chamber 3 and the recess 14 is a deforming part 4 which is deformed in response to a change in the pressure within the pressure chamber 3. Another wall part, being integrated with the above-mentioned wall, which defines part of the dummy chamber 6 and exists between the dummy chamber 6 and the recess 14 is a non-deforming part 5 which is not influenced by the pressure within the pressure chamber 3. The depth of the recess 14, that is, the height of steps 14a and 14b, is 0.2 mm in this embodiment.

The film 7 is received in the recess 14 and is wound around the outer periphery of the body 1. The film 7 is a rectangular thin sheet of an amorphous magnetic alloy having a thickness of 0.03 mm. This amorphous magnetic alloy is of the Fe-Si-B-Cr type. The amorphous magnetic alloy film 7 is fixedly bonded to the body 1 by an imide-system adhesive as a bonding material. For bonding the film 7 to the body 1, a pressure of 10 atm. is applied to the film 7 at 250° C. for one hour. The bonding of the film 7 by application of pressure is carried out by fitting a tube 21 of a heat-shrinkable resin on the film 7 and then by heating this tube to shrink. At this time, since the depth of the recess 14 is greater (sufficiently greater, in this case) than the thickness of the film 7, there is a possibility that part of the adhesive disposed between the film 7 and the body 1 is squeezed out to the outer surface of the film 7. After this bonding operation, the tube is removed. The steps 14a and 14b serve as positioning means which prevents the film 7 from being displaced along the axis of the body 1 during bonding of the film 7 by the adhesive.

The circumferential length of the film 7 may be sufficiently long to surround the outer periphery of the body 1, either with the opposite side edge portions of the film 7 overlapping each other, or with the opposite side edges of the film 7 butted together (see Example 5). Alternatively, the circumferential length of the film 7 may be shorter not to completely surround the outer periphery of the body 1, with the opposite side edges of the film 7 spaced apart from each other.

The bobbin 10 having two peripheral grooves is fitted on the body 1 to cover the recess 14. The pressure detector coil 8 (whose number of turns is 100) is received in one of the two peripheral grooves close to the flange 1b, and the dummy coil 9 (whose number of turns is 100) is received in the other peripheral groove. Both coils 8 and 9 are used as permeability detector elements, and cooperate with the amorphous magnetic alloy film 7 to form a magnetic circuit. The detector unit 13 comprises resistors which constitute, together with the coils 8 and 9, a bridge, and a differential amplifier.

The yoke 11 is a magnetic shield member of a cylindrical cup-shape, and is fixedly secured by an adhesive to the bobbin 10 and/or the flange 1b to cover the bobbin 10.

The operation of the pressure sensor of this example will now be described. The pressure of a fluid to be measured is transmitted to the pressure chamber 3 via the pressure introducing opening 2, and applies a force in a direction to expand the deforming part 4 defining the pressure chamber 3. As a result, the part 4 is deformed, so that the amorphous magnetic alloy film 7 adhesively bonded to the outer surface of the part 4 is deformed. This deformation changes the permeability of the amorphous magnetic alloy film 7 due to the magnetostriction effect. This permeability change is detected by the pressure detector coil 8 as a change in inductance, and the pressure change is obtained by detecting a differential output between the coil 8 and the dummy coil 9 through the detector unit 13.

The yield rate of the pressure sensor of the example, in manufacturing of the sensor, is about 70%, and is about two times higher than that of the conventional pressure sensor. The reason for this is that at the time of coating the adhesive, the excess of the adhesive tending to cause irregularities in the adhesive layer escapes to a space 14C defined by the greater steps 14a and 14b, so that the bonding conditions on both parts 4 and 5 become closer to a uniform condition.

According to the example, the pressure sensor having a higher yield rate than those of conventional sensors was obtained.

EXAMPLE 2

A second example of the present invention will now be described with reference to FIGS. 2 and 3a–3c. Those portions of this example identical respectively to those of the first example of FIG. 1 and the prior art of FIG. 7 and 8a–8c are designated by identical reference numerals, respectively, and explanation thereof will be omitted, and only those portions constituting features of this example will be described.

Figure 2:
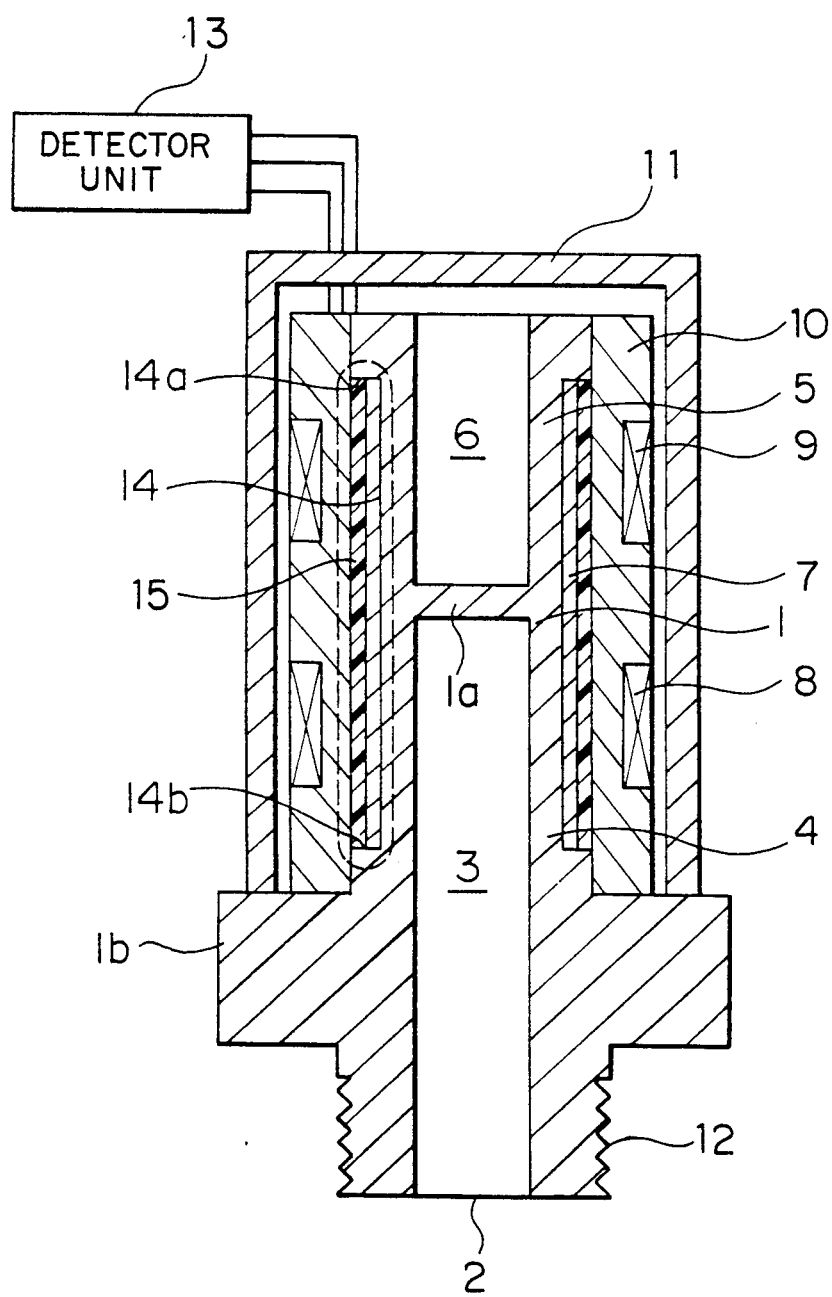
FIG. 2 is a vertical cross-sectional view of a second embodiment of a pressure sensor of the invention.
Figure 3A:
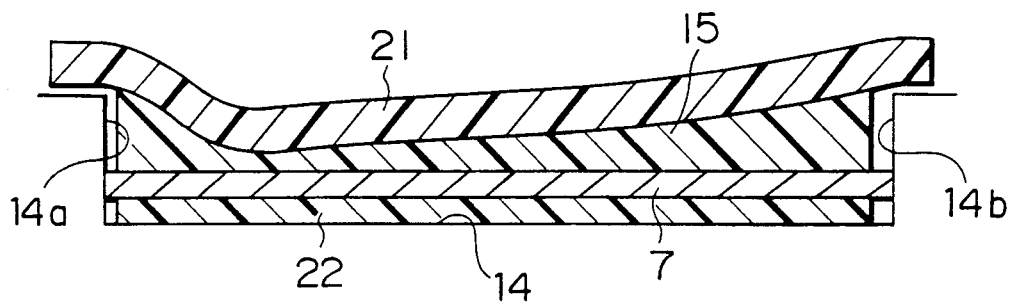
FIGS. 3a to 3c are enlarged, cross-sectional views of that portion of FIG. 2 indicated by a dotted line, showing the manner of shrinkage of a heat-shrinkable tube used in the second embodiment.
Figure 3B:
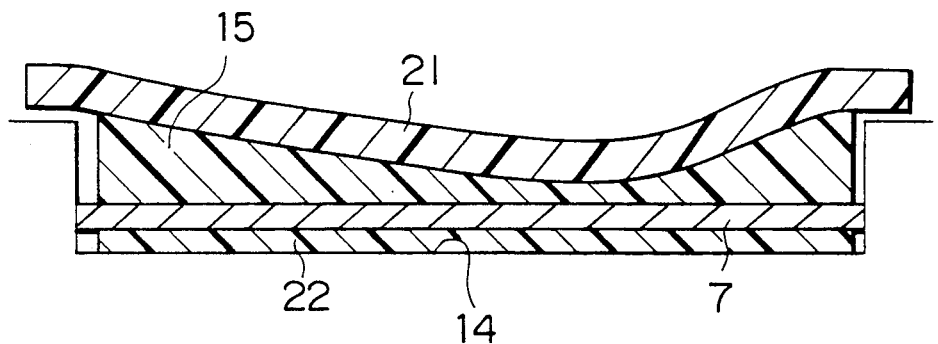
Figure 3C:
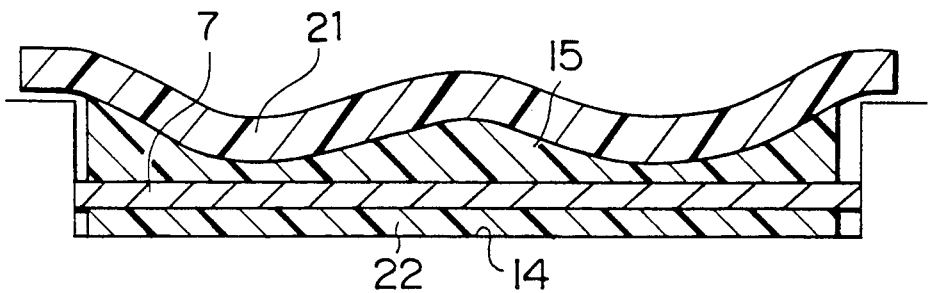

The feature of this example is that an imide-system adhesive which is used to bond an amorphous magnetic alloy film 7 to a body 1 is also coated, as a buffer material (easily-deformable pressure-applying medium), onto an outer surface of the amorphous magnetic alloy film 7 (see FIG. 2). The use of the buffer-material 15 eliminates the effects of the non-uniformity of a heat-shrinkable tube 21. This condition is shown in FIGS. 3a to 3c which are enlarged views of that portion of FIG. 1 indicated by a dotted line. It will be appreciated that no matter how the heat-shrinkable tube 21 is shrunk, the adhesive layer 22 inside the amorphous magnetic alloy film 7 is made uniform in thickness, so that the uniform bonding can be achieved.

As a result, the pressure sensor of this example achieved a yield rate of 100% in manufacturing of the sensor and higher corrosion resistance than those of conventional sensors.

The pressure sensor of this example was dipped in hot water of 80° C. for about one week, but no corrosion was found on the surface of the film 7.

According to this example, there was obtained a pressure sensor having a higher yield rate.

EXAMPLE 3

A third example of the invention will now be described with reference to FIG. 4. The present example is basically similar in structure to the first example of FIG. 1, and therefore detailed description of the present example will be omitted, and only those portions constituting features of this example will be described.

Figure 4:
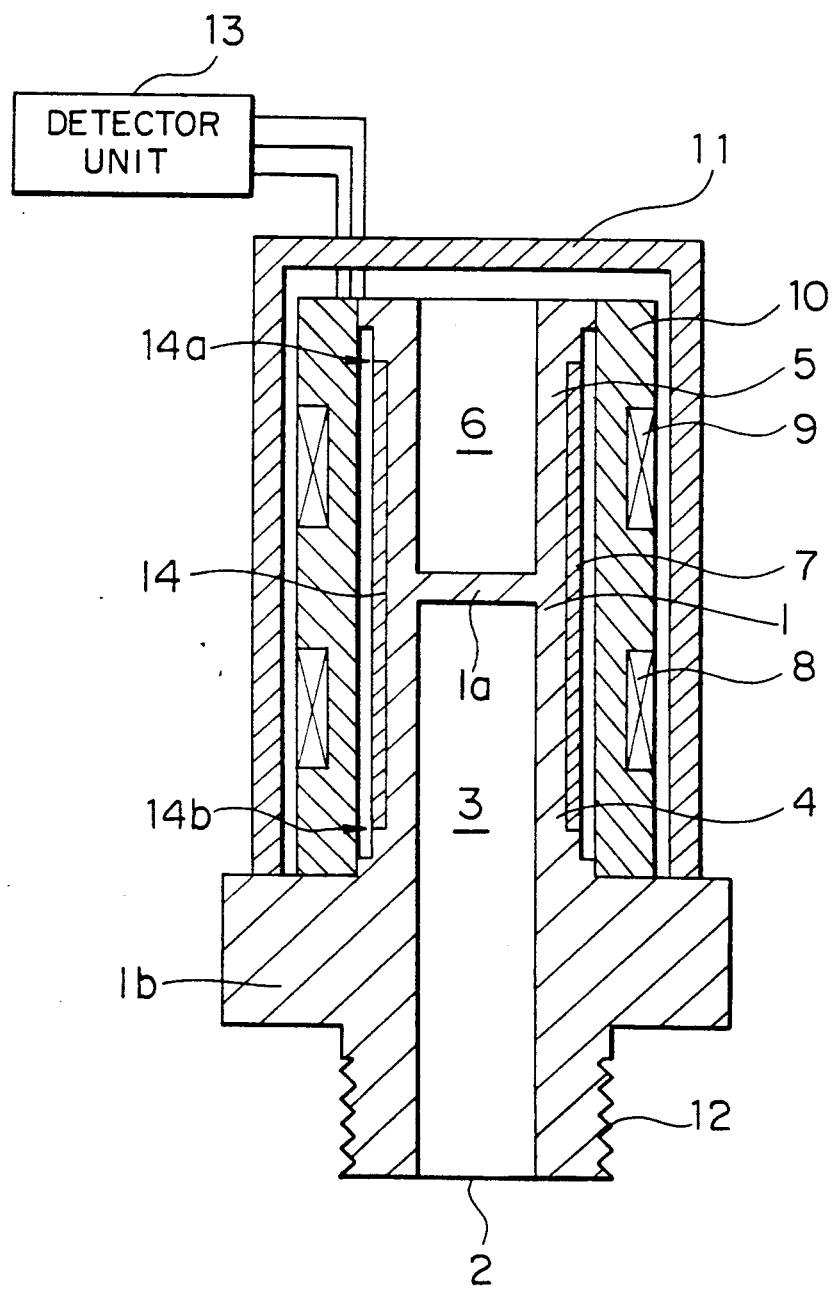
FIG. 4 is a vertical cross-sectional view of a third embodiment of a pressure sensor of the invention.
Figure 10:
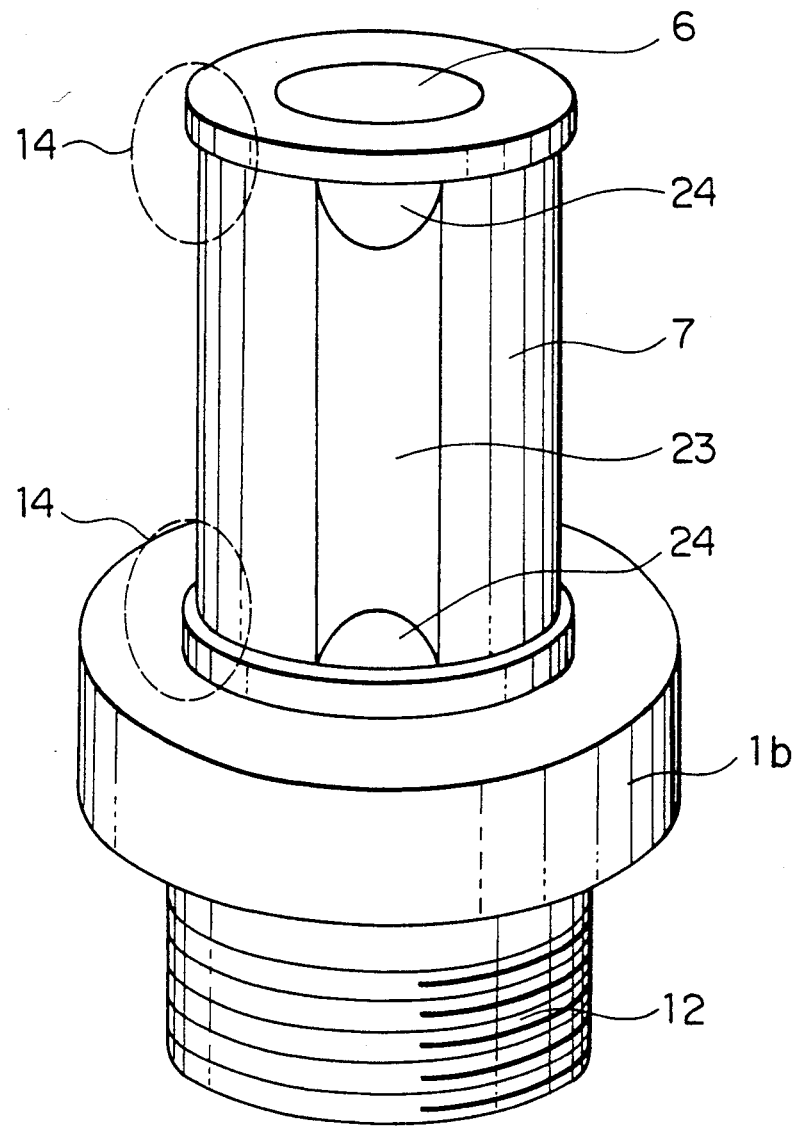
FIG. 10 is a perspective view of the conventional pressure sensor, showing exfoliation parts in the pressure sensor.

The feature of this example is that each of steps 14a and 14b has the shape of a two-step stair (see FIG. 4). The height of the inner step portion is 0.1 mm, and the height of the outer step portion is 0.2 mm. An amorphous magnetic alloy film 7 was adhesively bonded to a body 1 having the steps 14a and 14b of such a shape, and a heat cycle test (cycle of −40° C. and 150° C.) was conducted 800 times. As a result, no exfoliation part as shown in FIG. 10 was recognized. The reason for this is that at the time of bonding the film 7, a heat-shrinkable tube is shrunk in accordance with the configuration of the stair-like steps 14a and 14b, so that the adhesive residing at the steps 14a and 14b is more dispersed as compared with the first embodiment, thereby reducing the concentration of stress on the adhesive layer during the heat cycle test.

According to this example, there was obtained a pressure sensor having higher durability than those of conventional sensors.

In this example, although the number of the step portions of the stair-like steps 14a and 14b is two, it may be more than two in which case the adhesive can be dispersed more effectively, so that the stress concentration is further restrained, thereby improving the durability.

EXAMPLE 4

A fourth example of the invention will now be described with reference to FIG. 5. The present example is basically similar in structure to the first example of FIG. 1, and therefore detailed description of this example will be omitted, and only those portions constituting features of this example will be described.

Figure 5:
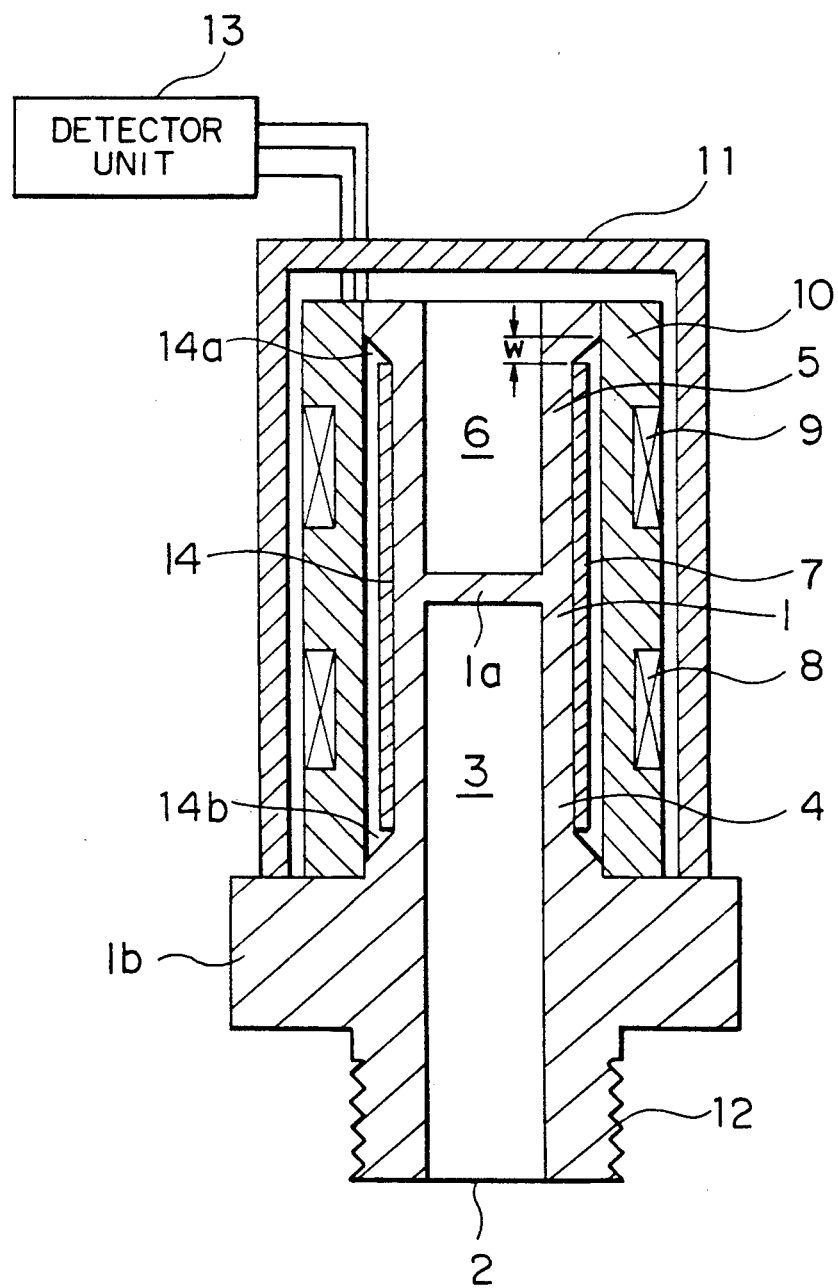
FIG. 5 is a vertical cross-sectional view of a fourth embodiment of a pressure sensor of the invention.

The feature of this example is that each of steps 14a and 14b is tapered or inclined (see FIG. 5). The width (w) of the tapered portion is 1 mm. An amorphous magnetic alloy film 7 was adhesively bonded to a body 1 having the steps 14a and 14b of such a tapered shape, and a heat cycle test (cycle of −40° C. and 150° C.) was conducted 800 times. As a result, as in the third example, no exfoliation part as shown in FIG. 10 was recognized. The reason for this is that at the time of bonding the film 7, a heat-shrinkable tube is shrunk in accordance with the configuration of the tapered steps 14a and 14b, so that the adhesive hardly resides at the steps 14a and 14b as compared with the first example, thereby greatly reducing the concentration of stress on the adhesive layer during the heat cycle test.

According to this example, there was obtained a pressure sensor having higher durability than that of the conventional sensor.

EXAMPLE 5

The present example will now be described with reference to FIG. 6 and FIG. 1. This example is basically similar in structure to the first example of FIG. 1, and therefore detailed description of this example will be omitted, and only those portions constituting features of this example will be described.

Figure 6:
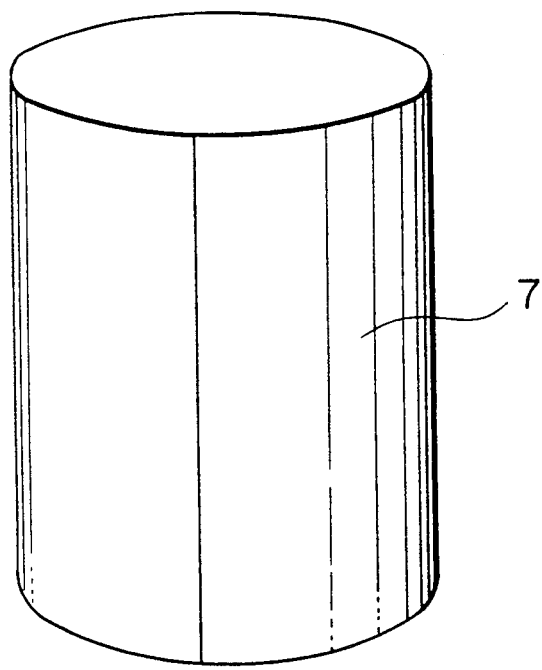
FIG. 6 is a perspective view of an amorphous magnetic alloy film constituting a fifth embodiment of the invention.
Figure 8A:
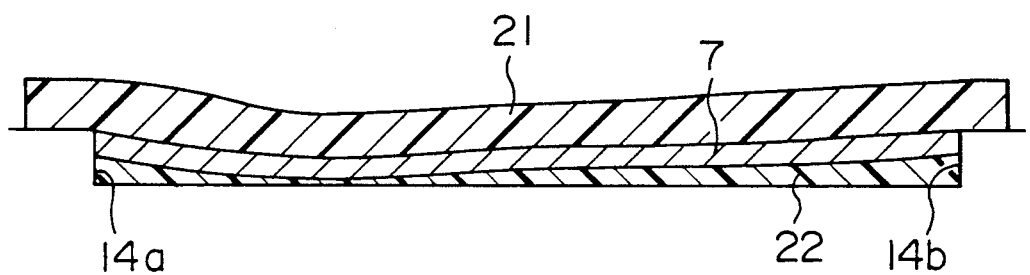
FIGS. 8a to 8c are enlarged, cross-sectional views of that portion of FIG. 7 indicated by a dotted line, showing the manner of shrinkage of a heat-shrinkable tube.
Figure 8B:
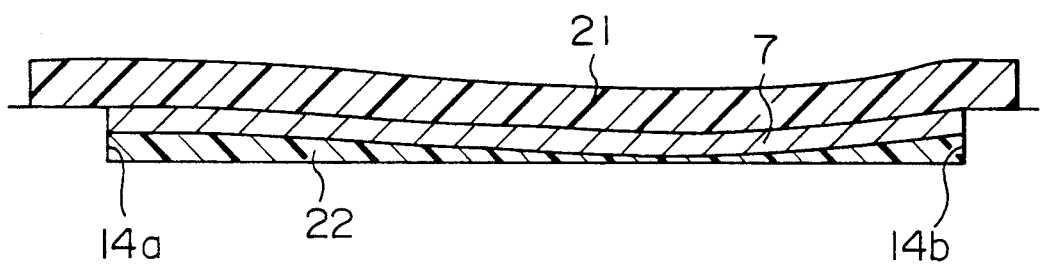
Figure 8C:
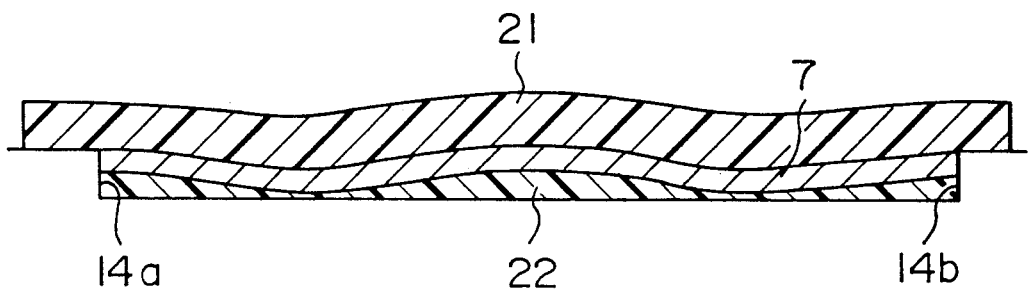
Figure 9:
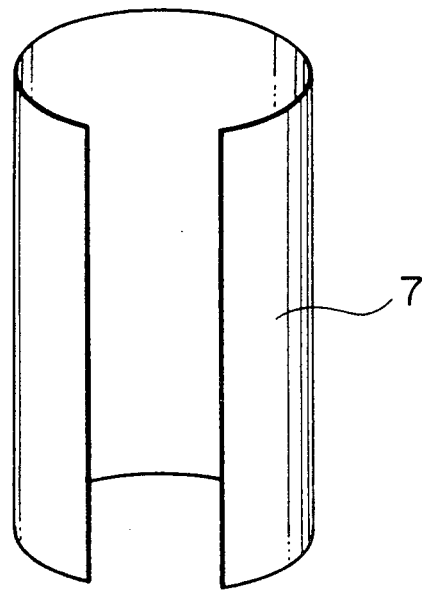
FIG. 9 is a perspective view of an amorphous magnetic alloy film used in the conventional pressure sensor.

The feature of this example is that the circumferential length of an amorphous magnetic alloy film 7 is equal to the circumferential length of a cylindrical body 1 (FIG. 1), so that the film 7 has such a shape as shown in FIG. 6. Therefore, when the film 7 is adhesively bonded on the surface of the body 1 including a deforming part 4 and a non-deforming part 5, a gap as designated at 23 in FIG. 10 will not be formed, and the cylindrical body 1 is completely surrounded by the film 7 over the entire circumference of the body 1.

The pressure sensor of this example was subjected to a heat cycle test (cycle of −40° C. and 150° C.) 500 times. As a result, as in the third example, no exfoliation part as designated at 24 in FIG. 10 was recognized.

With this structure, there is achieved an advantage that the durability can be improved without complicating the shape of the steps 14a and 14b as in the third and fourth example.

According to the example, there was obtained the pressure sensor having higher durability than those of conventional sensors.

What is claimed is:

1. In a pressure sensor comprising a pressure introducing portion; a cylindrical deforming part defining a pressure chamber capable of being strained by a pressure fed thereto via said pressure introducing portion; a cylindrical non-deforming part; a film of an amorphous magnetic alloy exhibiting a magnetostriction effect secured to the deforming part and the non-deforming part; and a pair of permeability detector elements mounted respectively on the deforming part and the non-deforming part so as to detect permeability of the amorphous magnetic alloy film, the permeability detector elements cooperating with the amorphous magnetic alloy film to form a magnetic circuit; the pressure being determined by the difference between the permeabilities detected respectively by the pair of permeability detector elements which difference occurs when the pressure is fed to the pressure chamber; a recess being formed in outer surfaces of the deforming part and the non-deforming part, so that a pair of steps are formed at opposite ends of the recess, respectively;

the improvement wherein the depth of the recess is larger than the thickness of the amorphous magnetic alloy film, the amorphous magnetic alloy film is received in and affixed relative to the recess and extends between the pair of steps; the film is wound around and fixedly bonded with a bonding material on the outer periphery of the body within the recess, and the bonding material is an imide-system adhesive.

2. In a pressure sensor comprising a pressure introducing portion; a cylindrical deforming part defining a pressure chamber capable of being strained by a pressure fed thereto via said pressure introducing portion; a cylindrical non-deforming part; a film of an amorphous magnetic alloy exhibiting a magnetostriction effect secured to the deforming part and the non-deforming part; and a pair of permeability detector elements mounted respectively on the deforming part and the non-deforming part so as to detect permeability of the amorphous magnetic alloy film, the permeability detector elements cooperating with the amorphous magnetic alloy film to form a magnetic circuit; the pressure being determined by the difference between the permeabilities detected respectively by the pair of permeability detector elements which difference occurs when the pressure is fed to the pressure chamber; a recess being formed in outer surfaces of the deforming part and the non-deforming part, so that a pair of steps are formed at opposite ends of the recess, respectively;

the improvement wherein the depth of the recess is larger than the thickness of the amorphous magnetic alloy film, the amorphous magnetic alloy film is received in and affixed relative to the recess and extends between the pair of steps, and a buffer material is applied to an outer surface of the amorphous magnetic alloy film.

3. A pressure sensor according to claim 2, in which the buffer material is a bonding material.

4. In a pressure sensor comprising a pressure introducing portion; a cylindrical deforming part defining a pressure chamber capable of being strained by a pressure fed thereto via said pressure introducing portion; a cylindrical non-deforming part; a film of an amorphous magnetic alloy exhibiting a magnetostriction effect secured to the deforming part and the non-deforming part; and a pair of permeability detector elements mounted respectively on the deforming part and the non-deforming part so as to detect permeability of the amorphous magnetic alloy film, the permeability detector elements cooperating with the amorphous magnetic alloy film to form a magnetic circuit; the pressure being determined by the difference between the permeabilities detected respectively by the pair of permeability detector elements which difference occurs when the pressure is fed to the pressure chamber a recess being formed in outer surfaces of the deforming part and the non-deforming part, so that a pair of steps are formed at opposite ends of the recess, respectively;

the improvement wherein the depth of the recess is larger than the thickness of the amorphous magnetic alloy film, the amorphous magnetic alloy film is received in and affixed relative to the recess and extends between the pair of steps, and each of the steps has a shape of at least two steps.

5. In a pressure sensor comprising a pressure introducing portion; a cylindrical deforming part defining a pressure chamber capable of being strained by a pressure fed thereto via said pressure introducing portion; a cylindrical non-deforming part; a film of an amorphous magnetic alloy exhibiting a magnetostriction effect secured to the deforming part and the non-deforming part; and a pair of permeability detector elements mounted respectively on the deforming part and the non-deforming part so as to detect permeability of the amorphous magnetic alloy film, the permeability detector elements cooperating with the amorphous magnetic alloy film to form a magnetic circuit; the pressure being determined by the difference between the permeabilities detected respectively by the pair of permeability detector elements which difference occurs when the pressure is fed to the pressure chamber a recess being formed in outer surfaces of the deforming part and the non-deforming part, so that a pair of steps are formed at opposite ends of the recess, respectively;

the improvement wherein the depth of the recess is larger than the thickness of the amorphous magnetic alloy film, the amorphous magnetic alloy film is received in and affixed relative to the recess and extends between the pair of steps, and each of the steps has a tapered shape.

6. In a pressure sensor comprising a pressure introducing portion; a cylindrical deforming part defining a pressure chamber capable of being strained by a pressure fed thereto via said pressure introducing portion; a cylindrical non-deforming part; a film of an amorphous magnetic alloy exhibiting a magnetostriction effect secured to the deforming part and the non-deforming part; and a pair of permeability detector elements mounted respectively on the deforming part and the non-deforming part so as to detect permeability of the amorphous magnetic alloy film, the permeability detector elements cooperating with the amorphous magnetic alloy film to form a magnetic circuit; the pressure being determined by the difference between the permeabilities detected respectively by the pair of permeability detector elements which difference occurs when the pressure is fed to the pressure chamber; a recess being formed in outer surfaces of the deforming part and the non-deforming part, so that a pair of steps are formed at opposite ends of the recess, respectively;

the improvement wherein the depth of the recess is larger than the thickness of the amorphous magnetic alloy film, the amorphous magnetic alloy film is received in and affixed relative to the recess and extends between the pair of steps, and the amorphous magnetic alloy film covers peripherally the entire cylindrical outer-surface of the portion comprising the deforming part and the non-deforming part having the recess.

7. A pressure sensor according to claim 6, the bonding material is an imide-system adhesive.

* * * * *